United States Patent Office 3,078,214
Patented Feb. 19, 1963

3,078,214
TREATMENT OF MENTAL DISTURBANCES
WITH ESTERS OF INDOLES
Albert Hofmann and Franz Troxler, Bottmingen, Basel-Land, Switzerland, assignors to Sandoz A.G. (also known as Sandoz Ltd.), Basel, Switzerland
No Drawing. Filed Apr. 1, 1960, Ser. No. 19,204
Claims priority, application Switzerland Sept. 12, 1958
2 Claims. (Cl. 167—65)

This application is a continuation-in-part of copending application Serial No. 838,037, filed September 4, 1959 (abandoned since the filing of the present application).

The present invention relates to new esters of the indole series and the use thereof in the treatment of mental disturbances. More particularly, the invention is especially concerned with therapeutically valuable esters of the formula

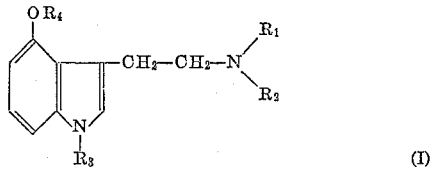

(I)

wherein each of $R_1$ and $R_2$ is a lower alkyl group (e.g. methyl, ethyl, propyl, isopropyl, butyl, isobutyl, etc.), the two groups being identical or different, $R_3$ stands for a hydrogen atom or a lower alkyl group (e.g. methyl, ethyl, propyl, isopropyl, butyl, isobutyl, etc.) or a lower aralkyl group (e.g. benzyl, phenylethyl, phenylpropyl, benzhydryl, etc.), and $R_4$ stands for a residue of a monobasic or polybasic oxygen-containing inorganic acid (e.g. sulfuric acid, phosphoric acid, etc.) or of an organic carboxylic or sulfonic acid (e.g. acetic acid, benzoic acid, p-toluene-sulfonic acid, pivalic acid, etc.) or of an N-lower alkyl-carbamic acid (e.g. N-methyl-carbamic acid, etc.).

The new esters of Formula I are prepared by esterifying a corresponding hydroxy-indole

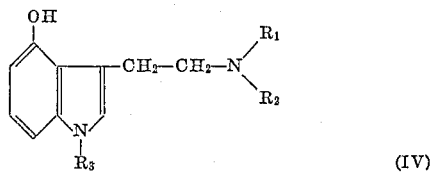

(IV)

wherein $R_1$, $R_2$ and $R_3$ have the precedingly-recited significances, by treatment with an appropriate reactive derivative of a monobasic or polybasic oxygen-containing acid or of an organic carboxylic or sulfonic acid, or by reaction with an alkyl isocyanate, in an inert organic solvent, whereby in some cases the presence of a tertiary organic base is preferred.

More specfically, the process may be carried out as follows:

A hydroxy-indole of Formula IV is first dissolved either in water containing one mol of a base, or in the form of a salt with an inorganic base in an inert solvent, following which an appropriate acid derivative is added to the solution. Suitable acid derivatives comprise advantageously acid halides, more especially acid chlorides such as e.g. acetyl chloride, benzoyl chloride, p-toluene-sulfonic acid chloride, chlorosulfonic acid, etc.; acetic anhydride may also be employed with advantage for acetylation. For example, 4-hydroxy-N-dimethyl-tryptamine in the form of an alkali metal salt thereof is reacted with benzoyl chloride in an inert solvent such as toluene, 1,2-dimethoxy-ethane, tertiary amyl alcohol, etc., the reaction mixture shaken for several hours at room temperature (about 20° to about 30° C.) and then distributed between water and a water-immiscible organic solvent. The organic phase is separated and dried and the solvent evaporated. The residual crude product can be crystallized directly from a suitable solvent or solvent mixture, such e.g. as chloroform or ethyl acetate-petroleum ether, etc. If necessary, preliminary purification can be effected by filtration through a column of aluminum oxide.

Where a carbamic acid ester of Formula I is being prepared ($R_4$ being for example lower alkyl-NH—COO), the starting compound of Formula IV is advantageously dissolved in an inert solvent such e.g. as chloroform; the addition of a tertiary organic base such for example as triethylamine, dimethylaniline, etc. is here advantageous. The appropriate alkyl isocyanate is then added to the solution at room temperature, after which the solvent is evaporated. Further purification is carried out as above described.

The 1-position-unsubstituted hydroxy-indoles of Formula IV, i.e. a first subgroup of starting compounds having the formula

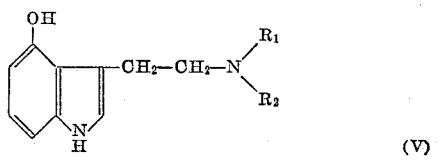

(V)

wherein $R_1$ and $R_2$ are as precedingly defined, can be prepared for example by condensing a substituted indole of the formula

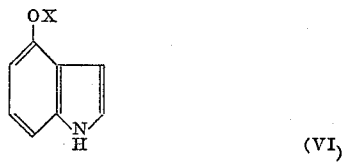

(VI)

wherein X is a protective group, e.g. a benzyl group or another group which is capable of being easily split off, first with a dihalide of oxalic acid, e.g. oxalyl chloride, and then with a secondary amine of the formula

wherein $R_1$ and $R_2$ are as precedingly defined e.g. dimethylamine, piperidine, etc. The resulting condensation product is reduced e.g. with lithium aluminum hydride in absolute dioxane, after which the protective group X is split off from the obtained indole of the formula

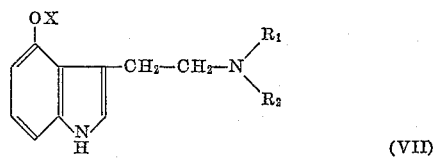

(VII)

for example by hydrolysis with hydrobromic acid in glacial acetic acid or preferably by hydrogenation over a palladium catalyst.

The hydroxy-indoles of Formula IV which are substituted in the 1-position, i.e. a second subgroup of starting compounds having the formula

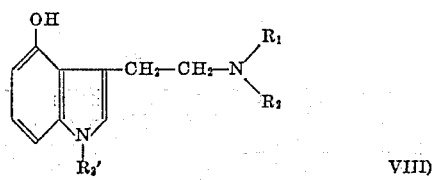

wherein $R_1$ and $R_2$ are as precedingly defined and $R_3'$ stands for a lower alkyl or a lower aralkyl group, can be prepared for example from the above said indoles of Formula VII by alkylation or aralkylation according to per se known methods. The benzyl radical, which it is preferred to use as protective group, is then split off e.g. by catalytic hydrogenation.

The new compounds of the present invention are solid and generally well crystallized substances at room temperature. They all give a positive color reaction—the shade of which varies in accordance with substituents present—with Keller's reagent (glacial actic acid containing ferric chloride and concentrated sulfuric acid). The said new compounds are characterized by interesting and therapeutically useful pharmacodynamic properties. In particular, they stimulate the central sympathetic nervous system, which stimulation is manifested in the form of mydriasis, increase in blood pressure and body temperature, increase in blood sugar, as well as by an inhibition of intestinal motility. The said esters also exhibit distinct serotonin-antagonistic properties and stimulate the spinal reflexes. At the same time, the esters exert a mild sedative and tranquilizing action. In addition, they suppress the sedative and convulsion-stimulating action of reserpine. In view of their central vegetative and their tranquilizing as well as of their reserpine-antagonizing properties, they are useful in the treatment of the most diverse mental illnesses, such more especially as compulsive neuroses as well as depressions, mood changes and anxiety states of neurotic or psychotic origin. The indole-esters of Formula I, supra, have a very low toxicity. They are practically quantitatively resorbed by the animal organism and are therefore preferably administered perorally, but can equally well be administered subcutaneously, intramuscularly or intravenously. While they are thus intended for therapeutic purposes, they are also valuable intermediates for the preparation of other medicaments.

The following examples illustrate the invention but are not limitative thereof in any way. Parts and percentages are by weight, unless otherwise indicated; the relationship between parts by weight and parts by volume is the same as that between grams and milliliters. Temperatures are in degrees centigrade; melting points are uncorrected.

Example 1

0.408 part of 4-hydroxy-N-dimethyltryptamine and 2 parts by volume of 1-normal aqueous caustic soda solution are evaporated to dryness, the dry residue dissolved in 15 parts by volume of 1,2-dimethoxy-ethane, after which a solution of 0.267 part of benzoyl chloride in 5 parts by volume of 1,2-dimethoxy-ethane is added. The mixture is shaken for two hours and then distributed between water and chloroform. The chloroform phase is separated and dried over potassium carbonate, then evaporated to dryness and the residue crystallized from ethyl acetate-petroleum ether, whereupon 4-hydroxy-N-dimethyltryptamine-benzoic acid ester—3-(2'-dimethylaminoethyl)-4-benzoxy-indole—is obtained as hexagonal plates which melt at 109–111°. Keller's color reaction: brownish violet.

The 4-hydroxy-N-dimethyltryptamine is prepared as follows:

12 parts of 4-benzyloxy-indole are dissolved in 300 parts of ether and 9.6 parts of oxalyl chloride are stirred dropwise into the solution at 0–3°. 30 minutes later, 20 parts of anhydrous dimethylamine are slowly added while stirring and cooling with ice; the mixture is then stirred for a few minutes at room temperature and filtered. The precipitate is washed thoroughly with water and the water-insoluble portion is dried in a high vacuum. The dimethylamide of [4-benzyloxy-indolyl-(3)]-glyoxylic acid is thus obtained as a yellow crystalline powder which melts at 148–150° after crystallization from benzylmethanol-petroleum-ether. A solution of 4 parts of the latter in 80 parts by volume of absolute dioxane is stirred dropwise into a solution of 5 parts of lithium aluminum hydroxide in 100 parts by volume of absolute dioxane. The mixture is refluxed for 24 hours. The complex which has been formed and excess of reducing agent are then decomposed by treatment wtih methanol and a saturated solution of sodium sulfate, the mixture filtered and the filtrate shaken out with a solution of tartaric acid and ether. The ether solution is discarded, while the tartaric acid extract is made alkaline to phenolphthalein by addition of concentrated caustic soda solution. The crude base, which thereby separates out as an oily substance, solidifies slowly. The so-obtained 4-benzyloxy-dimethyltryptamine is dissolved in benzene and the benzene solution filtered through a column of aluminum oxide. The so-obtained colorless oil—4-benzyloxy-N-dimethyltryptamine—crystallizes from ether-petroleum ether as prisms which melt at 119–121°.

A solution of 4-parts of 4-benzyloxy-N-dimethyltryptamine in 100 parts by volume of methanol is shaken with 2 parts of palladium catalyst on aluminum oxide and hydrogen. When the hydrogen uptake has finished, the solution is filtered and the solvent evaporated to dryness. The residue is sublimated in a high vacuum at a temperature of 130°, whereby snow-white 4-hydroxy-N-dimethyltryptamine of M.P. 173–176° is obtained. Keller's color reaction: blue.

Example 2

0.408 part of 4-hydroxy-N-dimethyltryptamine in the form of the sodium salt is reacted with acetyl chloride in 1,2-dimethoxy-ethane solution, after the manner described in Example 1, and the reaction mixture is allowed to stand for two hours and then worked up after the manner described in Example 1. After crystallization from ether-petroleum ether, the obtained 4-hydroxy-N-dimethyltryptamine-acetic acid ester—3-(2'-dimethylaminoethyl)-4-acetoxy-indole—melts at 92–95°. Keller's color reaction: green, becomes violet.

Example 3

4-hydroxy-N-dimethyltryptamine in the form of the potassium salt is reacted with one mol of p-toluene-sulfonic acid chloride, after the manner described in Example 1, after which the resultant reaction product is worked up after the manner described in such example. The so-obtained 4-hydroxy-N-dimethyltryptamine-p-toluene-sulfonic acid ester—3-(2'-dimethylaminoethyl)-4-p-toluene-sulfonyloxy-indole—crystallizes from chloroform as short prisms which melt at 134–136°. Keller's color reaction: brownish violet, turning violet.

Example 4

0.500 part of 4-hydroxy-N-dimethyltryptamine is dissolved in 8 parts by volume of absolute chloroform, after which 0.2 part by volume of triethylamine and 1.5 parts by volume of methylisocyanate are added, and the mixture allowed to stand three hours at 20°. The mixture is then evaporated to dryness, and the so-obtained crude product (0.730 part of colorless oil) is chromatographed on 15 parts of aluminum oxide. The desired reaction product—4 - hydroxy - N - dimethyltryptamine -O - (N'-methyl-carbamic acid)-ester, which may also be termed 3 - (2' - dimethylaminoethyl) - 4 - methylcarbamoyloxy-indole—is washed into the filtrate with benzene +½% ethanol; the product crystallizes from chloroform as compact prisms which melt at 141–144°. Keller's color reaction: gradually brown-violet.

*Example 5*

0.510 part of 4-hydroxy-N-dimethyltryptamine is added in a nitrogen atmospheer to a sodium ethylate solution (prepared from 0.058 part of metallic sodium and 30 parts by volume of absolute ethanol). After 15 minutes, the mixture is evaporated to dryness, and the residue further dried for another hour at 70° in high vacuum. Thereupon, 20 parts by volume of absolute 1,2-dimethoxy-ethane are added, followed by 0.305 part of chlorosulfonic acid. After one hour, the mixture is evaporated to dryness and the residue then chromatographed on the 50-fold quantity of cellulose powder with water-saturated n-butanol. Upon evaporating the so-obtained fraction, 4-hydroxy-N-dimethyltryptamine-sulfonic acid ester—3-(2'-dimethylaminoethyl)-4-sulfonyloxy-indole—crystallizes out. Recrystallized from methanol, it is obtained in the form of needles which melt at 251–252°. Keller's color reaction: royal blue. Van Urk's color reaction: dark blue-violet.

*Example 6*

0.345 part of sodium is dissolved in 30 parts by volume of ethanol, 2.81 parts of 4-hydroxy-N-dimethyltryptamine are added in a nitrogen atmosphere, and the mixture then evaporated to dryness. 40 parts by volume of 1,2-dimethoxy-ethane are then added to the dry residue, followed by a solution of 1.69 parts of trimethyl acetyl chloride (pivalic acid chloride) in 20 parts by volume of 1,2-dimethoxy-ethane, after which the mixture is stirred for three hours at room temperature. The reaction mixture is filtered through talc, the filtrate evaporated to dryness, and the residue chromatographed on a column of aluminum with chloroform. The so-obtained 4 - hydroxy - N - dimethyltryptamine - trimethyl-acetic acid ester—3 - (2' - dimethylaminoethyl) - 4 - trimethyl-acetoxy-indole—crystallizes from benzene-petroleum ether in the form of small shuttle- and druse-shaped crystals which melt at 123–124°. Keller's color reaction: green. Van Urk's color reaction: light blue.

*Example 7*

0.547 part of sodium is dissolved in 50 parts by volume of tertiary amyl alcohol, after which 4.61 parts of 1-methyl-4-hydoxy-N-dimethyltryptamine are added to the solution in a nitrogen atmosphere, the mixture heated to boiling for a short time and then evaporated to dryness. To the resultant residue 40 parts by volume of 1,2-dimethoxy-ethane are added, followed by a solution of 3.3 parts of benzoylchloride in 40 parts by volume of 1,2-dimethoxy-ethane, the mixture being then stirred for three hours at room temperature. Filtration through talc is then effected, the filtrate evaporated to dryness, and the resultant residue chromatographed with benzene on a column of aluminum oxide. The so-obtained 1-methyl-4-hydoxy-N-dimethyltryptamine-benzoic acid ester—1-methyl-3-(2'-dimethylaminoethyl) - 4-benzoxy-indole—crystallizes from benzene-petroleum ether in the form of needles which melt at 69.5–71°. Keller's color reaction: greenish. Van Urk's color reaction: negative.

The 1-methyl-4-hydroxy-N-dimethyltryptamine, used as starting material, can be prepared as follows:

4-benzyloxy-N-dimethyltryptamine, together with metallic potassium is stirred in liquid ammonia for 30 minutes at —60°. Methyl iodide is added, the ammonia evaporated after 15 to 30 minutes, the residue distributed between water and chloroform, the chloroform extract evaporated and the residual crude product chromatographed on aluminum oxide. The obtained 1-methyl-4-benzyloxy-N-dimethyltryptamine, crystallizes from ether in the form of rodlets which melt at 62–67°. The compound is shaken in methanol solution with hydrogen and palladium catalyst on aluminum oxide until the uptake of hydrogen ceases, whereupon the catalyst and solvent are removed. The so-obtained 1-methyl-4-hydroxy-N-dimethyltryptamine crystallizes from methanol-ether as irregular plates which melt at 125–127°. Keller's color reaction: gray. Van Urk's color reaction: green.

Having thus disclosed the invention, what is claimed is:

1. The method of treating mental disturbances of neurotic and psychic origin, which comprises administering a therapeutically effective dose of a compound, having psychic stimulant properties, of the formula

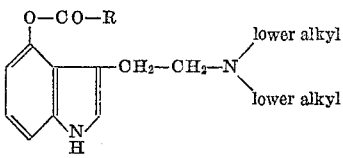

wherein R is a member selected from the group consisting of lower alkyl and phenyl groups.

2. The method of treating mental disturbances of neurotic and psychic origin, which comprises administering a therapeutically effective dose of a compound, having psychic stimulant properties, of the formula

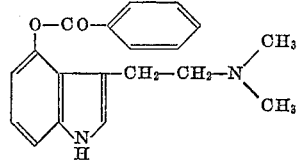

References Cited in the file of this patent

UNITED STATES PATENTS

| | | |
|---|---|---|
| 2,708,197 | Speeter | May 10, 1955 |
| 2,814,625 | Speeter | Nov. 26, 1957 |
| 2,854,379 | Fancher | Sept. 30, 1958 |
| 2,902,404 | Spencer | Sept. 1, 1959 |
| 2,930,797 | Anthony et al. | Mar. 29, 1960 |

OTHER REFERENCES

Hofmann et al., Experientia, vol. XIV, Fasc. 3, pp. 107-109, March 3, 1959.